US009017779B2

(12) United States Patent
Ikeda et al.

(10) Patent No.: US 9,017,779 B2
(45) Date of Patent: Apr. 28, 2015

(54) INKJET RECORDING MEDIUM, PRINTED MATERIAL, METHOD FOR PRODUCING SAME, AND PACKAGE

(75) Inventors: Takeo Ikeda, Satte (JP); Hiroaki Matsubara, Satte (JP); Mitsuru Kitada, Takaishi (JP); Yoshitaka Satoh, Sakura (JP); Kiyomi Nagano, Satte (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/004,731

(22) PCT Filed: Mar. 26, 2012

(86) PCT No.: PCT/JP2012/057743
§ 371 (c)(1),
(2), (4) Date: Dec. 23, 2013

(87) PCT Pub. No.: WO2012/133301
PCT Pub. Date: Oct. 4, 2012

(65) Prior Publication Data
US 2014/0106140 A1 Apr. 17, 2014

(30) Foreign Application Priority Data

Mar. 31, 2011 (JP) ................................. 2011-078628
Jun. 22, 2011 (JP) ................................. 2011-138362
Jul. 25, 2011 (JP) ................................. 2011-161965

(51) Int. Cl.
| | |
|---|---|
| *B41M 5/00* | (2006.01) |
| *B41M 5/52* | (2006.01) |
| *B32B 27/08* | (2006.01) |
| *B32B 27/32* | (2006.01) |
| *B32B 17/10* | (2006.01) |
| *B41M 5/50* | (2006.01) |
| *B41M 7/00* | (2006.01) |

(52) U.S. Cl.
CPC .............. *B41M 5/5254* (2013.01); *B32B 27/08* (2013.01); *B32B 27/32* (2013.01); *B32B 17/10* (2013.01); *B41M 5/5263* (2013.01); *B41M 5/506* (2013.01); *B41M 2205/38* (2013.01); *B41M 7/0027* (2013.01); *B41M 5/508* (2013.01); *B41M 5/5281* (2013.01)

(58) Field of Classification Search
CPC ........ B41M 5/506; B41M 5/508; B41M 5/52; B41M 5/5263; B32B 17/10; B32B 27/08; B32B 27/32
USPC ...................... 428/32.17, 32.3, 203, 500, 515
See application file for complete search history.

(56) References Cited

U.S. PATENT DOCUMENTS

| | | | |
|---|---|---|---|
| 2002/0039642 A1 | 4/2002 | Inoue et al. | |
| 2002/0115015 A1* | 8/2002 | Romano et al. | ............... 430/200 |
| 2002/0119274 A1* | 8/2002 | Yang et al. | ................... 428/40.1 |
| 2003/0118790 A1* | 6/2003 | Ilda et al. | ...................... 428/195 |
| 2003/0203135 A1 | 10/2003 | Emslander et al. | |

FOREIGN PATENT DOCUMENTS

| | | |
|---|---|---|
| CN | 1142441 A | 2/1997 |
| JP | 10-119428 A | 5/1998 |
| JP | 11-011001 A | 1/1999 |
| JP | 2001-150612 A | 6/2001 |
| JP | 2002-011937 A | 1/2002 |
| JP | 2002-103802 A | 4/2002 |
| JP | 2002-127596 A | 5/2002 |
| JP | 2002-144551 A | 5/2002 |
| JP | 2003-80856 A | 3/2003 |
| JP | 2003-080856 A | 3/2003 |
| JP | 2004-531416 A | 10/2004 |
| JP | 2005-132032 A | 5/2005 |
| JP | 2006-21530 A | 1/2006 |
| JP | 2006-035796 A | 2/2006 |
| JP | 2007-130780 A | 5/2007 |
| WO | 03/004268 A1 | 1/2003 |

OTHER PUBLICATIONS

International Search Report for PCT/JP212/057743, Mailing Date of Jun. 26, 2012.
Extended European Search Report dated Oct. 6, 2014, issued in corresponding European Patent Application No. 12763650.4 (7 pages).
Chinese Office Action dated Jun. 26, 2014, issued in Chinese Patent Application No. 201280013238.7 (19 pages).

* cited by examiner

*Primary Examiner* — Betelhem Shewareged
(74) *Attorney, Agent, or Firm* — Westerman, Hattori, Daniels & Adrian, LLP

(57) ABSTRACT

The present invention provides an ink jet recording medium which is capable of uniform coating with an ink-receiving agent without a surface treatment step for a usual plastic film used as a base material, and which, due to excellent adhesion, does not cause the problem of peeling after ink jet printing, and does not cause the problem of ink binning, fading, dropout, or peeling or peeling of an ink-receiving layer and an over-coating layer, and also provides a printed material formed by ink jet printing on the ink jet recording medium. The ink jet recording medium including a first layer containing a polyolefin resin as a main component, a second layer containing an acid-modified olefin resin, and an ink-receiving layer is used, the ink-receiving layer being formed by applying an ink-receiving agent on the second layer after the first and second layers are laminated by a coextrusion laminating method.

11 Claims, No Drawings

INKJET RECORDING MEDIUM, PRINTED MATERIAL, METHOD FOR PRODUCING SAME, AND PACKAGE

TECHNICAL FIELD

The present invention relates to a method for producing an ink jet recording medium capable of ink jet recording even on plastic substrates, an ink jet. recording medium, a printed material produced by ink jet printing on the medium, and a printed material further overcoated, and particularly relates to an ink jet recording medium which causes no problem of ink blurring, dropout, peeling, separation, or the like after printing and which permits a printed material to be used directly as a packaging material, a printed material, a method for producing the recording medium and printed material, and a packaging material including the printed material.

BACKGROUND ART

Clear images and excellent print quality could have been obtained by technological development in ink jet color printers which form color hard copies at high speed. On the other hand, in order to further improve print quality, chroma, appearance, and images, recording materials having higher levels of properties have been required. In particular, with improvements in printing speed, resolution, chroma, and the like, recording materials have been required to have higher characteristics than usual, such as an ink quick drying property, high-absorption capacity, control of ink dot diameter and blurring, surface gloss, and the like.

Ink jet recording materials including paper as a base material have the problem that contact, with water causes a phenomenon referred to as "cockring" in which the base material waves, or a tear in the base material, thereby worsening an appearance. In order to resolve the problem, it has been proposed that printing is performed on an ink jet recording medium including a plastic film used as a base material, and an ink-receiving layer provided on the plastic film (refer to, for example, Patent Literatures 1 to 4). Such a medium is excellent in water resistance and can also be used for outdoor advertisement and posters, labels, wallpaper, and the like. However, a surface of the plastic film in contact with an ink-receiving agent has low adhesion to the ink-receiving agent, and thus a surface treatment process is usually necessary for forming a layer referred to as an anchor layer, a primer layer, an undercoat layer, an adhesive layer, or the like on the surface of the plastic film. The surface treatment, process leads to not only an increase in cost but also an increase of one step as compared with a case without such treatment, thereby increasing the time required for production. Further, when the surface treatment is performed by applying a coating material containing a solvent, a step of removing the contained solvent is required, and when the solvent is an organic solvent, load on the environment, is increased.

As a method for resolving the above-described problems, an ink jet image-receiving sheet is disclosed, in which a thermoplastic resin film having a Laminated structure including two or more layers is used as a base material and is directly coated with an ink-receiving agent (for example, refer to Patent Literature 5). However, the sheet specifically provided in Patent Literature 5 has a surface composed of high-density polyethylene, and thus cissing may occur in the ink-receiving agent to cause difficulty in clean print finishing. Also, the sheet has the problem of peeling of a print portion due to change with time in adhesion between the receiving agent and the base (film).

Further, from the viewpoint of avoiding contamination of contents, printing on packaging materials has been performed by a simple method in which an ink is printed only on a surface side of a material to be printed, and an ink is not printed on a back side in contact with the contents. This method is called a "surface printing method". However, in the surface printing method, print fading or dropout may occur due to impact by friction or the like to impair appearances, and during heat sealing for packaging, an ink may be removed by a sealing bar to cause peeling of print, and contamination of a packaging machine, and also in a packaging material having an ink-receiving layer, the ink-receiving layer may be cracked to cause defects in an appearance. Known methods for preventing these problems include lamination of a protective layer (film) on an image surface of a printed material, and so-called over-coating treatment of coating with a coating agent, and these methods are used according to applications of the formed printed materials (refer to, for example, Patent Literatures 6 and 7). However, the over-coating treatment causes peeling or blurring on a print, surface, or the like during the work unless adhesion between the plastic film and the receiving agent is secured, not leading to fundamental resolution of the problems.

CITATION LIST

Patent Literature

PTL 1: Japanese Unexamined Patent Application Publication Ho. 10-119428
PTL 2: Japanese Unexamined Patent Application Publication No. 2001-150612
PTL 3: Japanese Unexamined Patent Application Publication No. 2002-103802
PTL 4: Japanese Unexamined Patent Application Publication No. 2007-130780
PTL 5: Japanese Unexamined Patent. Application Publication No. 2002-011937
PTL 6: Japanese Unexamined Patent. Application Publication No. 2006-035796
PTL 7: Japanese Unexamined Patent Application Publication No. 2002-144551

SUMMARY OF INVENTION

Technical Problem

In consideration of the above-described problems, an object of the present invention is to provide an ink jet recording medium which is capable of uniform coating with an ink-receiving agent, without a surface treatment step essential for a usual plastic: film used as a base material, and which, due to excellent adhesion between a plastic film and a receiving agent, does not cause the problem of peeling or the like after ink jet printing, and further does not cause the problem of ink blurring, fading, dropout, or peeling, or peeling of an ink-receiving layer and an over-coating layer, or the like during an over-coating treatment, and also provide a printed material formed by ink jet. printing on the ink jet recording medium, a method for producing the recording medium and the printed material, and a packaging material composed of the printed material.

Solution to Problem

As a result of intensive research conducted for resolving the problems, the inventors found that the problems can be resolved by using, as a base material, a multilayer film formed by laminating a layer (A1) containing a polyolefin resin (a1) as a main component and a layer (A2) containing an acid-modified olefin resin (a2), leading to the achievement of the present invention.

The present invention provides a method for producing an ink jet recording medium, the method including laminating a layer (A1) containing a polyolefin resin (a1) as a main component and a layer (A2) containing an acid-modified olefin resin (a2) by a coextrusion laminating method, and then forming an ink-receiving layer (B) by applying an ink-receiving agent (b) on the layer (A2), also provides an ink jet recording medium produced by the method, and further provides a printed material formed by ink jet recording on the ink-receiving layer (B) of the medium and a packaging material using the printed material.

Advantageous Effects of Invention

An ink jet recording medium of the present invention can be simply produced by applying an ink-receiving agent on a co-extruded multilayer film. The design of the ink jet recording medium can be easily changed by selecting a layer structure of the multilayer film according to the intended performance (transparency, rigidity, processability, and the like) and applications (a packaging material, a poster, a label, and the like), thereby causing excellent versatility. Also, a step of forming an anchor layer (primer layer) can be omitted by using the coextrusion method, thereby causing the effect of reducing the production time and cost and causing high usefulness.

In addition, the printed material formed by ink jet printing on the recording medium can be stored over a long time because of good adhesion between the ink-receiving layer and the multilayer film used as the base material. Further, peeling or the like does not occur in a print portion even in a step of over-coating the printed material, and thus the printed material can be used directly, and the printed material can be preferably used as a packaging material for a bag or the like by secondary processing.

DESCRIPTION OF EMBODIMENTS

A plastic film serving as a base material of an ink jet recording medium and of a printed material formed by printing on the medium according to the present invention has at least a layer (A1) containing a polyolefin resin (a1) as a main component and a layer (A2) containing an acid-modified olefin resin (a2). The layer (A2) functions as a base material and also functions as an easily adhesive layer to an ink-receiving layer (B). In the present invention, the term "main component" represents that a content of the specified resin is 80% by mass or more relative to the total amount of a resin composition constituting the layer, and a content of the specified resin is preferably 85% by mass or more. In addition, in the present invention, the term "containing" represents that a content of the specified resin is 1% by mass or more relative to the total amount of a resin composition constituting the layer, and a content of the specified resin is preferably 20% by mass or more.

In the ink jet recording medium and the printed material of the present invention, the side opposite to a printed surface includes the layer (A1) containing the polyolefin resin (a1) as a main component. Usable examples of the polyolefin resin (a1) include homopolymers or copolymers of α-olefins having 2 to 6 carbon atoms. The form of a copolymer may be a block copolymer or a random copolymer. In addition, the polyolefin resin (a1) preferably has a melting point of 110° C. or more in view of maintenance of an appearance during molding after recording, particularly maintenance of an appearance during over-coating and molding for use as a packaging material, and suppression of warpage of the film.

For example, any one of polyolefin resins known as polypropylene resins, polyethylene resin, and the like can be used as the polyolefin resin (a1). Examples of the polypropylene resins include propylene homopolymers, propylene-ethylene copolymers, propylene-butene-1 copolymers, propylene-ethylene-butene-1copolymers, ethylene-propylene block copolymers, metallocene catalyst-based polypropylene, and the like. These may be used alone or in combination of two or more. When the ink jet recording medium before ink jet recording is wound into a roll and stored for a long period of time, a crystalline propylene resin is preferably used from the viewpoint of preventing blocking. In the specification, the term "crystalline" represents that a peak of 0.5 J/g or more appears within a range of 95° C. to 250° C. in DSC (differential scanning calorimetry).

The polypropylene resin preferably has a melt flow rate (hereinafter referred to as "MFR at 230° C."; a value measured at 230° C. and 21.18 N according to JIS K7210:1999) of 0.5 to 30.0 g/10 min and a melting point of 120° C. to 165° C., more preferably has a MFR at 230° C. of 2.0 to 15.0 g/10 min and a melting point of 125° C. to 162° C. With the MFR and melting point within these ranges, the film little shrinks even during molding after printing, over-coating and heat molding for use as a packaging material, and the like, thereby permitting the appearance of the printed surface to be maintained, causing no warping of the medium, and improving the film-forming properties for forming the co-extruded multilayer film. In addition, the density is preferably 0.890 to 0.910 g/cm³, more preferably 0.85 to 0.905 g/cm³.

In particular, when a propylene-ethylene block copolymer is used for the layer (A1), a surface can be modified into a satin-like surface so that the occurrence of wrinkles can be suppressed when the multilayer film is wound into a roll, and blocking can be reduced when the roll is stored. The propylene-ethylene block copolymer is a resin produced by block polymerization of propylene and ethylene, and examples thereof include propylene-ethylene block copolymers produced by polymerizing ethylene in the presence of a propylene homo-polymer or polymerizing ethylene and propylene, and the like.

In addition, when a mixed resin of a crystalline propylene resin and ethylene-propylene rubber (hereinafter referred to as "EPR") is used for the layer (A1), the surface of the layer (A1) can be easily modified into a satin-like surface. In this case, a propylene homopolymer with high versatility is preferably used as the crystalline propylene resin. On the other hand, the EPR used preferably has a weight-average molecular weight within a range of 400,000 to 1,000,000 and more preferably within a range of 500,000 to 800,000 from the viewpoint that the surface can be modified into a satin-like surface by forming irregularities on the film surface. In addition, the EPR content in the mixed resin is preferably within a range of 5 to 35% by mass from the viewpoint that the film surface can be uniformly modified into a satin-like surface. The mixed resin of the crystalline propylene polymer and EPR preferably has a MFR (230° C.) within a range of 0.5 to 15g/10 min in view of the ease of extrusion processing. The weight-average molecular weight of EPR is determined by GPC (gel permeation chromatography) measurement of a component extracted from the mixed resin by a cross-fractionation method at 40° C. using ortho-dichlorobenzene as a solvent. The content of EPR in the mixed resin is determined from an amount of EPR extracted from the mixed resin by a cross-fractionation method at 40° C. using ortho-dichlorobenzene as a solvent.

Examples of a method for producing the mixed resin of the crystalline propylene resin and EPR include, but are not particularly limited to, a method of separately producing a propylene homopolymer and ethylene-propylene rubber using a Ziegler catalyst by a solution polymerization method, a slurry polymerization method, a vapor phase polymerization method, or the like and then mixing both by a mixer, a two-step polymerization method including a first step of producing a propylene homopolymer and a second step of producing EPR in the presence of the homopolymer, and the like.

The Siegler catalyst is a so-called Ziegler-Natta catalyst and is, for example, a combination of a carrier supported catalyst and a co-catalyst including an organic metal compound such as an organic aluminum compound or the like, the carrier supported catalyst being formed by supporting a transition metal compound on a carrier such as a transition metal compound, such as a titanium-containing compound, or a magnesium compound, or the like.

The polyethylene resin is, for example, medium-density polyethylene (MDPE), high-density polyethylene (HOPE), or the like, and the density is preferably 0.92 to 0.97 g/cm$^3$. With the density within this range, proper rigidity is achieved, and the film-forming properties and extrudability are improved. The polyethylene resin preferably has a MFR (190° C., 21.18 N) of 2 to 20 g/10 min, and more preferably 3 to 10 g/10 min. With MFR within this range, extrusion moldability of the film is improved, and the occurrence of wrinkles, which easily occur by rolling the multilayer film, can be suppressed, thereby improving the feeding properties from the roll. Further, the polyethylene resin preferably has a melting point of 110° C. to 135° C., and more preferably a melting point of 115° C. to 130° C. With the melting point within this range, the film little shrinks during molding after printing and even when the film is humidified in over-coating or secondary processing for use as a packaging material, or the like, and thus the appearance of a printed surface can be maintained, and the warping of the film can be suppressed. These polyethylene resins may be used alone or in combination of two or more.

The layer (A1) containing the polyolefin resin (a1) as the main component may have a single layer or a multilayer structure including two or more layers. In view of excellent rigidity and heat resistance and excellent processability of secondary processing of the printed material, a film including a single layer or multilayer structure mainly composed of a polypropylene resin is preferred. For example, when the printed material is used for a package, as described in Japanese Unexamined Patent. Application Publication No. 2006-213065, the outermost layer of a surface opposite to a printed surface includes a heat seal layer containing a 1-butene copolymer composed of 1-butene and propylene as essential components, and a copolymer composed of propylene and ethylene as essential components so that, an easily openable bag can be formed. Similarly, when the printed material is used as a cover material, a multilayer structure as described in Japanese Unexamined Patent Application Publication Nos. 2004-75181and 2008-80543 can impart easy openability. Further, by using a cyclic polyolefin resin as described in Japanese Unexamined Patent. Application Publication No. 2010-234660 as one of the layers in a multilayer structure, a tearable printed material can be formed. It is preferred to use any one of various multilayer structures according to application of the printed material.

In addition, an ink jet printed material (label) attachable to a signboard, a vehicle, and the like can be produced by providing an adhesive layer on the layer (A1) [on the surface opposite to the layer (A2) described below]. Examples of an adhesive include, but are not particularly limited to, natural rubber-based, synthetic rubber-based, acryl-based, urethane-based, vinyl ether-based, silicone-based, and amide-based and styrene-based adhesives, styrene-based elastomers, olefin-based elastomers, and the like. If required, for the purpose of controlling adhesive properties or the like, the adhesive layer may contain a proper tackifier, for example, a terpene resin such as an α-pinene or β-pinene polymer, a diterpene polymer, an α-pinene-phenol copolymer, or the like, a hydrocarbon resin such as an aliphatic, aromatic, or aliphatic-aromatic copolymer, or the like, a rosin resin, coumarone-indene resin, an (alkyl)phenol resin, a xylene resin, or the like. In particular, in view of the production cycle, a preferred method is to laminate the adhesive layer on the layer (A1) opposite to the layer (A2) by co-extrusion at the same time as co-extrusion of the layer (A1) and the layer (A2) described below.

The layer (A2) according to the present invention is a layer containing the acid-modified olefin resin (a2) as an essential component. The olefin component of the acid-modified polyolefin resin (a2) is not particularly limited, but alkenes having 2 to 6 carbon atoms, such as ethylene, propylene, isobutylene, 2-butene, 1-butene, 1-pentene, 1-hexene, and the like, are preferred, and a mixture thereof may be used. Among these, alkenes having 2 to 4 carbon atoms, such as ethylene, propylene, isobutylene, 1-butene, and the like, are more preferred, ethylene and propylene are still more preferred, and ethylene is most preferred. The acid-modified polyolefin resin (a2) is required to contain a (meth)acrylic acid ester component. Examples of the (meth)acrylic acid ester component include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth)acrylate, octyl (meth)acrylate, dodecyl (meth)acrylate, stearyl (meth)acrylate, and the like. In view of easy availability and adhesiveness, methyl (meth)acrylate, ethyl (meth)acrylate, butyl (meth)acrylate, and hexyl acrylate are preferred, and methyl acrylate and ethyl acrylate are more preferred. The form of the (meth) acrylic acid ester component is not limited as long as it is copolymerized with the olefin component, and examples of the mode of copolymerization include random copolymerization, block copolymerization, graft copolymerization (graft modification), and the like. (The term "(meth)acrylic acid" represents "acrylic acid or methacrylic acid". Examples of an ethylene-(meth)acrylate copolymer include Elvaloy (trade name: manufactured by Mitsui-Dupont Polychemical Co., Ltd.), Acryft (trade name: manufactured by Sumitomo Chemical Co., Ltd.), and the like. These may be used alone or as a mixture of two or more.

The acid-modified polyolefin resin (a2) may be one acid-modified with an unsaturated carboxylic acid component. Examples of the unsaturated carboxylic acid component include acrylic acid, methacrylic acid, maleic acid, maleic anhydride, itaconic acid, itaconic anhydride, fumaric acid, crotonic acid, half esters and half amides of unsaturated dicarboxylic acids, and the like. In particular, acrylic acid, methacrylic acid, maleic acid, and maleic anhydride are preferred, and acrylic acid and maleic anhydride are particularly preferred. The form of the unsaturated carboxylic acid component is not limited as long as it is copolymerised with the olefin component. Examples of the mode of copolymerization include random copolymerization, block copolymerization, graft copolymerization (graft modification), and the like. Examples of an ethylene-acrylic acid copolymer include Nucrel (trade name: manufactured by Mitsui-DuPont Polychemical Co., Ltd.), and the like. Examples of an ethylene-(meth)acrylate-maleic anhydride copolymer include Bondine (trade name: manufactured by Tokyo Zairyo Co., Ltd.), and the like. These may be used alone or as a mixture of two or more.

The rate of acid modification of the acid-modified olefin resin (a2) is preferably 3 to 40%, more preferably 7 to 35%, and particularly preferably 10 to 30% in view of excellent balance between adhesion to the ink-receiving agent (b) described below, suppression of blocking during storage of a roll of the multilayer films, and suppression of appearance defects such as wrinkles or the like in the film in a drying step after the ink-receiving agent (b) is applied, and the like.

The layer (A2) according to the present invention may contain another resin in addition to the acid-modified olefin resin (a2). In particular, the acid-modified olefin resin (a2) is preferably combined with a polyolefin resin in view of mixing with the acid-modified olefin resin (a2) and easy co-extrusion with the layer (A1). In this case, the content of the acid-modified olefin resin (a2) is preferably 20 parts by mass or more and particularly preferably 50 parts by mass or more in 100 parts by mass of resin components constituting the layer (A2).

Any one of the examples of the polyolefin resin (a1) used in the layer (A1) can be preferably used as the polyolefin resin. In this case, the polyolefin resins used in the layer (A1) and the layer (A2) may be the same or different. The polyolefin resin used in the layer (A2) may be a single resin or a mixture of a plurality or types.

If required, components such as a de-fogging agent, an antistatic agent, a thermal stabilizer, a nucleating agent, an antioxidant, a lubricant, an anti-blocking agent, a release agent, an ultraviolet absorber, a colorant, and the like can be added to each of the layers (A1) and (A2) within a range where the object of the present invention is not impaired. In particular, since a surface friction coefficient is preferably 1.5 or less, particularly 1.0 or less, in order to impart processing suitability for film molding and packaging suitability for use of the printed material as a packaging material, a lubricant, an anti-blocking agent, and an antistatic agent are preferably appropriately added to a resin layer corresponding to the surface layer of the multilayer film.

The total thickness of the layers (A1) and (A2) can be appropriately determined according to application of the printed material and, for example, in the case of a packaging material (bag or cover material), the thickness is preferably within a range of 20 to 50 μm, while in the case of a label or poster, the thickness is preferably within a range of 70 to 1000 μm. The ratio of the thickness of the layer (A2) to the total thickness of the layers (A1) and (A2) is preferably within a range of 5 to 40% from the viewpoint of securing adhesion to the ink-receiving layer described below, and the thickness of the layer (A2) is preferably within a range of 2 to 30 μm.

A method for laminating the layer (A1) and the layer (A2) must be a coextrusion laminating molding method of laminating the layer (A1) and the layer (A2) adjacent to each other and is preferably, for example, a method including laminating the layer (A1) and the layer (A2) in a melt state by any one of various coextrusion methods for melt extrusion using two or more extruders, such as a coextrusion multilayer dies method, a feed block method, and the like, and then processing into a long rolled film by a method such as inflation, a T die-chill-roll method, or the like. The coextrusion method using a T die is more preferred.

In addition, in producing the multilayer film, the surface of the layer (A2) is preferably continuously treated by corona discharge, plasma discharge, or the like under heating or an inert gas atmosphere.

The ink jet recording medium of the present invention is produced by coating the multilayer film formed as described above with the ink-receiving agent (b) and then evaporating a solvent, contained in the ink-receiving agent (b) to form the ink-receiving layer (B) on the multilayer film. The ink jet printed material of the present invention is produced by ink jet printing on the ink-receiving layer (B).

The ink-receiving layer (B) preferably has a thickness within a range of 3 μm to 50 μm in order to maintain characteristics such as a practical level of ink absorption and the like and maintain good production efficiency, and more preferably has a thickness within a range of 5 μm to 30 μm in view of ink absorbability and coating strength of the ink-receiving layer (B).

A method for coating the film with the ink-receiving agent (b) is not particularly limited, but it is convenient to use, for example, a method using a coater, such as an air knife coater, a blade coater, a roll coater, a gravure coater, a comma coater, a gate roll coater, or the like.

A method for evaporating the solvent contained in the receiving agent after the ink-receiving agent (b) is applied to a film is not particularly limited but is generally, for example, a method of drying with a dryer. The drying temperature may be a temperature within a range which permits evaporation of the solvent and has no adverse effect on the substrate.

The ink-receiving agent (b) is not particularly limited and can be appropriately selected according to the type of the ink jet ink used. In particular, in the present-invention, it is necessary to provide a receiving layer having high ink absorbability, printability, and water-resistance of a printed image in view of formation of the ink receiving layer (B) on the multilayer film (A2).

A recording material referred to as a "microporous or void type" containing a large amount, of inorganic porous particles is proposed as the ink jet receiving layer, but it has the problems of cracking in the step of coating a base material and particularly low adhesion to a plastic substrate. As an example for resolving the problems, a recording material containing an anionic polyurethane resin having excellent adhesion to various substrates is exemplified (Japanese Unexamined Patent Application Publication No. 2002-317116).

Further, a printed material has recently been required to have a higher value added, and a recording material containing a cationic polyurethane resin having excellent gloss and transparency is exemplified for realizing higher image quality (higher gloss) equivalent to silver-salt photographs (Japanese Unexamined Patent Application Publication No. 2007-168164). In the present invention, in view of use of a plastic film required to have high graphical design function as the substrate, the receiving agent preferably contains a polyurethane resin.

Examples of the cationic polyurethane resin include a cationic aqueous polyurethane resin produced by dispersing, in water, a urethane prepolymer having quaternized tertiary amino groups and produced by reacting polyisocyanate, polycarbonate polyol, a tertiary amino group-containing chain extender, and polyalkylene oxide containing 50% by mass or more of ethylene oxide chain, a polyurethane resin having a cationic group in a side chain and provided in Japanese Unexamined Patent Application Publication No. 2007-168164 and the like, and the like.

These polar group-containing polyurethane resins are often water dispersions, and thus when used as the ink-receiving agent, the polyurethane resins are usually used in combination with an aqueous resin as a binder resin.

A water-soluble resin can be used as the binder resin, and examples thereof include polyvinyl alcohol, polyvinyl pyrrolidone, polyacrylamide, polyacrylic acid, polyhydroxyethyl acrylate, polyacryloylmorpholine, water-soluble polyvinyl acetal, poly-N-vinylacetamide, poly-N-vinylformamide, hydroxyethyl cellulose, hydroxypropyl cellulose, hydroxypropylmethyl cellulose, methyl cellulose, hydroxyethylmethyl cellulose, carboxylmethyl cellulose, gelatin, casein, starch, and the like. These can be used alone or as a mixture. In particular, polyvinyl alcohol is preferred.

A degree of saponification of the polyvinyl alcohol is particularly preferably 70 mol % or more and most preferably 85 mol % to 90 mol %. When the polyvinyl alcohol having a degree of saponification exceeding 90 mol % is used, compatibility with the urethane resin tends to decrease, and consequently, the gloss of the receiving layer may be decreased. In addition, the polyvinyl alcohol having any desired degree of polymerization can be used, but the degree of polymerization is preferably within a range of 500 to 4000 in view of improvements in ink absorbability, color density, and water resistance. The polyvinyl alcohol used may be modified polyvinyl alcohol having a modifying group as long as the degree of saponification and the degree of polymerization fall in the above-described respective ranges. Examples of the modifying group include an acetoacetyl group, a silyl group, a quaternary ammonium salt group, a carboxylic acid group, a carboxylic acid salt group, a sulfonic acid group, a sulfonic acid salt group, a ketone group, a mercapto group, an amino group, an ethylene group, and the like. The group can be introduced into the polyvinyl alcohol by copolymerizing vinyl acetate with a monomer having the modifying group.

Further, an aqueous rein emulsion other than the polyvinyl alcohol may e used as the binder resin. Examples thereof include polyvinyl pyrrolidone, polyvinyl acetal, polyalkylene oxide, starch, cellulose derivatives such as methyl cellulose, hydroxycellulose, hydroxypropyl cellulose, hyclroxypropylmethyl cellulose, carboxymethyl cellulose, and the like, polyethyleneimine, polyamide, various quaternary ammonium base-containing water-soluble resins, and modified products thereof, water-soluble resins such as epichlorohydrin polyamide resins, amine epichlorohydrin resins, polyethyleneimine salt-containing resins, polyvinylamide salt-containing resins, polyvinylamidine resins, polyallylamine salt-containing resins, polyaminesulfone salt-containing resins, polydiallyldimethylammonium chloride, dicyandiamide-formalin polycondensates, cation-modified polyvinyl alcohol, cation group-containing water-soluble acryl resins, cation-modified starch, chitosan neutral salts, and the like. Further, aqueous emulsions such as latexes of conjugated diene polymers such as styrene-butadiene copolymers, methyl methacrylate-butadiene copolymers, and the like, latexes of vinyl copolymers such as acryl polymers, styrene-vinyl acetate copolymers, and the like, polyurethane latex, polyester latex, and the like can be used.

In order to produce the ink jet printed material having a high ink absorption rate and an excellent quick drying property, an ink-receiving agent which is referred to as a "microporous type or void type" containing a large amount of porous inorganic fine particles may be used. Examples of the porous inorganic fine particles include particles of pseudo-boehmite alumina and silica produced by a vapor phase method. The ink-receiving layer (B) containing such inorganic fine particles has innumerable fine voids which absorb a solvent of an ink, thereby permitting printing.

In addition, when a pigment-based ink jet ink is used, the ink-receiving agent (b) preferably contains a water-soluble polyvalent metal salt. The term "water-soluble polyvalent metal salt" represents a polyvalent metal salt having solubility in water, for example, represents that when a saturated aqueous solution of a polyvalent metal salt is prepared using water of 20° C., the amount of the polyvalent metal salt, contained in 100 g of the saturated aqueous solution is 1 g or more. Examples of the water-soluble polyvalent metal salt include divalent metal salts such as magnesium salts, calcium salts, barium salts, iron(II) salts, copper(II) salts, zinc salts, and the like, trivalent metal salts such as aluminum salts, chromium salts, and the like.

By using such a water-soluble polyvalent metal salt, absorbability of a pigment-based ink can be improved, and water resistance of the printed material can be improved. Among the water-soluble polyvalent metal salts, water-soluble magnesium salts are preferably used in view of the high effect of improving pigment-based ink absorbability. For example, magnesium chloride, magnesium acetate, magnesium nitrate, magnesium sulfate, magnesium hydrochloride, and the like can be used. These may be used alone or in combination or two or more. Among the water-soluble magnesium salts, magnesium chloride is particularly preferred in view of good solubility in water, low cost, easy availability, and the high above-described four effects.

Further, the ink-receiving agent (b) preferably further contains an ultraviolet absorber and/or hindered amine-based light stabilizer for improving weather resistance when the printed material is used outdoors for a long period of time and under severe conditions.

Examples of the ultraviolet absorber include 2-(2'-hydroxy-3'-/lauryl-5'-methylphenyl)benzotriazole, methyl-3-[3-tert-butyl-5-(2H-benzotriazol-2-yl)-4-hydroxyphenyl] propionate-polyethylene glycol condensate, hydroxyphenylbenzotriazole derivatives, and the like.

Examples of the hindered amine-based light stabilizer include bis(2,2,6,6-tetramethyl-4-piperidyl) sebacate, bis (1,2,2,6,6-pentamethyl-4-piperidyl) sebacate, bis (1,2,2,6,6-pentamethyl-4-piperidyl) 2-(3, 5-di-tert-butyl-4-hydroxybenzyl)-2-n-butyimalonate, dimethyl succinate-1-(2-hydroxyethyl)-4-hydroxy-2, 2, 6, 6-tetramethylpiperidine polycondensate, poly[{6-(1,1,3,3-tetramethylbutyl) amino-1,3,5-triazine-2,4-diyl} {(2,2,6,6-tetramethyl-4-piperidyl) imino}hexamethylene{(2,2,6,6-tetramethyl-4-piperidyl) imino}], and the like.

Even when the ultraviolet absorber and the hindered amine-based light stabilizer are used alone or in combination, the amount of the ultraviolet absorber and hindered amine-based light stabilizer mixed is preferably within a range of 0.1 to 10 parts by mass relative to 100 parts by mass of the resin component in the receiving agent (b).

Further, other synthetic resins, a pigment, a water-resistant agent, a dispersant, a defoaming agent, and the like can be mixed in the receiving agent (b) according to application of the printed material within a range where the object of the present invention is not impaired.

The ink jet printed material of the present invention is produced by coating the multilayer film formed as described above with the ink receiving agent (b) and then performing printing on the receiving layer, but an overcoat layer (C) may be further laminated by overcoating.

Examples of an ink jet ink which can be used include a water dye-based ink, a water pigment-based ink, a solvent/oil-based ink, an ultraviolet curable ink, a thermofusible ink, and the like. In particular, the water pigment-based ink is preferred. In general, a water-soluble or water-dispersible organic resin is used. Examples of the resin include water-soluble acryl resins, polyester resins, polyether resins, cellulose resins, polyamide resins, polyvinyl alcohol resins, and the like. Also, a natural polymer may be used, and examples thereof include proteins such as gelatin, casein, albumin, and the like, and natural rubbers such as gum arabic and the like.

The printing method is preferably ink jet printing, but printing may be performed by another printing method such as offset printing, typographic printing, gravure printing, silk screen printing, or the like, or combination of two or more of the printing methods. In view of the problem of print durability, an ultraviolet curable ink is often used and preferred as an ink for offset printing, typographic printing, gravure printing, and silk screen printing.

Examples of the overcoating method include a method of polymerizing (crosslinking) an overcoat component by drying and/or heating or applying ultraviolet rays or low-voltage electron beams, a method of heat-transferring a film including a thermoplastic resin film as a main component using a heated roller, a method of overcoating by laminating a film through an adhesive, and the like. The overcoating method is not particularly limited to these methods as long as the method is capable of improving various types of durability, such as heat resistance, water resistance, weather resistance, and the like of the printed material. From the viewpoint of adhesion to the receiving agent, overcoating by UV curable ink jet, overcoating by applying a liquid coating solution, and overcoating by laminating a stretched or unstretched resin film through an adhesive are preferred, and overcoating by laminating a stretched or unstretched resin film through an adhesive is most preferred.

Examples of the adhesive for overcoating include an ester adhesive, an ether adhesive, a urethane adhesive, an epoxy adhesive, an acryl adhesive, a methacryl adhesive, a vinyl acetate-based adhesive, an olefin-based adhesive, a silicone-based adhesive, an isocyanate-based adhesive, a styrene-based adhesive, and the like. An ester adhesive, an ether adhesive, a urethane adhesive, an acryl adhesive, and a methacryl adhesive are preferred, and an ester adhesive and an ether adhesive are more preferred. Commercial products include an ester adhesive "LX500" manufactured by DIC Corporation, an ether adhesive "LX401A" manufactured by DIG Corporation, and the like.

Examples of the stretched or unstretched resin film for overcoating include a stretched polypropylene film, a stretched nylon film, a stretched polyester film, a stretched polystyrene film, an unstretched polyethylene film, an unstretched polypropylene film, a PVC film, a PVDC film, an acryl film, and the like. A stretched polypropylene film, a stretched nylon film, and a stretched polyester film are preferably used. Commercial products include a stretched polypropylene film "Pylen Film-OT" manufactured by Toyobo Co., Ltd., a stretched nylon film "Harden Film" manufactured by Toyobo Co., Ltd., a stretched polyester film "Soft Shine" manufactured by Toyobo Co., Ltd., and the like.

Each of the UV curable ink jet, liquid coating solution, and resin film for overcoating preferably further contains a light resistance improver in view of further improvement of light resistance of the printed material and prevention of deterioration in the ink jet recording medium composed of (A1)/(A2)/(B). Any light resistance improver may be used as long as it has the function of suppressing discoloration/fading of a recorded image due to ultraviolet light and visible light, and at least one selected from the group consisting of the above-described examples of the ultraviolet absorber and hindered amine-based light stabilizer (HALS) which can be combined with the receiving agent, an antioxidant, and a quencher can be preferably used.

Examples of the antioxidant include phenols such as hindered phenol and the like, chroman-, chraman-, hydroquinone derivative-, bensotriazole-based (not having ultraviolet absorbability), and spiroindan-based antioxidants, and the like.

Examples of the quencher include inorganic metal complexes of nickel, cobalt, and the like.

Even when the light resistance improvers are used alone or in combination, the content of the light resistance improve in the overcoat material is preferably 0.01 to 30% by mass and more preferably 0.1 to 20% by mass.

Examples of the packaging material including the ink jet printed material of the present invention include package bags, containers, cover materials of containers, and the like which are used for applications such as food, medicines, industrial components, miscellaneous goods, magazines, and the like. In particular, the packaging material can be preferably used for medicines and industrial components which are filled, packaged, and sealed as contents at high speed, food and confectionary which are room-temperature-, cold-, or freeze-stored, and the like. Also, the printed material is used not for the packaging material but for various purposes such as outdoor advertisement (a poster, a pennon, and the like), labels, wallpaper, postcards, OHP sheets, lottery tickets, ledger-sheets, and the like with no problem.

The packaging material is preferably formed into a package bag by heat-sealing together the layers (A1) of the multilayer films of the present invention, which are used as heat-seal layers, or heat-sealing the layer (A1) of the multilayer film to the printed surface or the overcoat. layer (C) formed by overcoating the printed surface in such a manner that the layer (A1) faces inward. For example, two printed materials are cut into the size of a desired package bag, laminated, and then heat-sealed at three sides thereof to form a bag, and the bag is filled with contents from one side not heat-sealed and then sealed, thereby permitting use as a package bag. Further, a package bag can also be formed by sealing the ends of a rolled sheet to form a cylindrical shape by an automatic packaging machine and then sealing the upper and lower ends.

Also, the layer (A1) can be heat-sealed with another film, sheet, or container, which is heat-sealable with the layer (A1), to form a package bag, a container, or a cover of a container. In this case, a film or sheet composed of a thermoplastic resin such as a polyethylene resin, a polypropylene resin, a polyester resin, or the like, can be used as the other film.

The packaging material using the printed material after-overcoating according to the present invention may have any desired tear starting portion such as a V-notch, an I-notch, perforations, fine pores, or the like, which is formed for weakening initial tear strength and improving openability.

EXAMPLES

The present invention is described in detail below by way of examples and comparative examples, but the present invention is not limited to these examples. In the examples, "parts" and "%" are based on mass unless otherwise specified.

[Evaluation of Coatability of Ink-Receiving Layer]

An A4-size film was coated with 10 g/m² of the receiving agent by a bar coater, and the number of cissings was measured by visual observation.

Good: No cissing
Poor: One or more cissings

[Evaluation of Heat Resistance of Film]

After coated with the receiving agent, the film was evaluated by visual observation of the appearance when dried at 80° C. for 5 minutes.

Good: Substantially no appearance defect such as twisting, wrinkling, film deformation, or the like
Fair: Slight appearance defect such as twisting, wrinkling, film deformation, or the like
Poor: Significant appearance defect, such as twisting, wrinkling, film deformation, or the like

[Evaluation of Adhesion of Ink Receiving Layer]

Evaluation was conducted by visual observation in a cellophane tape (manufactured by Nichiban Co., Ltd.) peeling test.

Good: No peeling of ink-receiving layer
Fair: Partial peeling of ink-receiving layer
Poor: Peeling of ink-receiving layer

[Evaluation of Printability]

Whether or not stable ink transfer (print) on the ink-receiving layer was performed was evaluated by visual observation.

Good: Good printing without print fading, an imprinted portion, or the like.
Poor: Poor printing with print fading, an imprinted portion, or the like.

[Evaluation of Adhesion of Printed Surface After Printing]

Evaluation was conducted by visual observation in a cellophane tape (manufactured by Nichiban Co., Ltd.) peeling test.

Good: No peeling
Poor: Peeling

[Evaluation of Durability of Printed Material]

The resultant, ink jet printed material was immersed in water for 45 minutes, dried at room temperature for 1 day, and then evaluated by visual observation in a cellophane tape (manufactured by Nichiban Co., Ltd.) peeling test.

Good: None of ink blurring, fading, dropout, and peeling, and peeling of ink-receiving layer was observed.
Poor: Any one or two or more defects of ink blurring, fading, dropout, and peeling, and peeling of ink-receiving layer were observed.

[Evaluation of Adhesion After Overcoating]

An adhesive was applied to the printed receiving layer (B) and laminated with a stretched resin film. The resultant printed material was cut into a strip specimen having a width of 15 mm, and interlayer strength of the specimen was measured by 90° peeling at a rate of 300 mm/min using a tensile tester (manufactured by A & D Co., Ltd.) in a constant-temperature room at 23° C. and 50% RH. Adhesion was evaluated from the obtained value of interlayer strength according to criteria below.

Good: Interlayer strength of 200 g/15 mm width or more
Poof: Interlayer strength of less than 200 g/15 mm width

[Packaging Machinability]

A printed material formed in each of the examples and comparative examples was formed into a bag by longitudinal pillow packaging described below using an automatic packaging machine.

Packaging machine: Gorika Giken Co., Ltd., Unipacker NUV472

Transverse seal: Resin layers (B) were sealed together at a rate of 30 bags/min., a longitudinal heat seal temperature of 150° C., and an air gauge pressure of 4 g/cm² while a transverse heat seal temperature was changed from 140° C. to 190° C. in increments of 10° C. A flat bag of 200 mm in length and 150 mm in width was formed.

Shrinkage/Wrinkling Test

Shrinkage, film fusion to a heat seal bar, wrinkling, and the like were evaluated by observing the appearance of a sealed portion of the flat bag formed by transverse (butt sealing) sealing and longitudinal sealing.

Good: Hone of shrinkage, fusion to the sealing bar, wrinkling, and the like was observed in the sealed portion.
Fair: Slight shrinkage, fusion to the sealing bar, wrinkling, or the like was observed in the sealed portion.
Poor: Shrinkage, fusion to the sealing bar, wrinkling, or the like was observed in the sealed portion.

Transverse Sealability

The bag formed using the printed material under the above-described conditions was naturally cooled at 23° C. and cut into a strip specimen with a width of 15 mm. Heat-seal strength of the specimen was measured by 90° peeling at a rate of 300 mm/min using a tensile tester (manufactured by A & D Co., Ltd.) in a constant-temperature room at 23° C. and 50% RH. Heat-sealability was evaluated from the obtained heat-seal strength according to criteria below.

Good: Heat-seal strength of 300 g/15 mm width or more.
Poor: Heat-seal strength of less than 300 g/15 mm width or unmeasurable neat-seal strength or delamination due to significant fusion/shrinkage of the film.

Preparation Example 1 of Ink-Receiving Agent

Hydran CP-7020 (manufactured by DIG Corporation, water dispersion of cationic polyurethane resin), a 25 mass % aqueous solution of PVA205 (manufactured by Kuraray Inc., polyvinyl alcohol with a degree of saponification of 87 mol % to 89 mol % and a degree of polymerization of 500), a 53.5 mass % aqueous solution of magnesium chloride hexahydrate, and a 25 mass % aqueous solution of DK-6830 (manufactured by Seiko PMC Corporation, epichlorohydrin polyamide resin) were sufficiently mixed with a stirrer provided with a propeller blade so that a mass ratio [water dispersion: 25 mass % aqueous solution of PVA205:53.5 mass % aqueous solution of magnesium chloride hexahydrate: 25 mass % aqueous solution of DK-6830] was 48.2:35.9:3.0:12.9, thereby preparing ink-receiving agent (b-1) containing a cationic polyurethane resin.

Preparation Example 2 of Ink-Receiving Agent

Ten parts of magnesium chloride, 30 parts of Hydran HW-970 (manufactured by DIG Corporation, water dispersion of polyurethane resin containing a polycarbonate chain and a sulfonic acid group as a hydrophilic group, nonvolatile content 40%), 30 parts of a 20% aqueous solution of Gohsetimer Z-100 (manufactured by Nippon Synthetic Chemical Industry Co., Ltd., acetoacetyl polyvinyl alcohol), and 30 parts of WS525 (manufactured by Seiko PMC Corporation, epichlorohydrin polyamide resin) were mixed, thereby preparing ink-receiving agent (b-2) containing an anionic polyurethane resin with a nonvolatile content, of 15% by mass.

Ink jet printing was performed on the ink-receiving layer (B) by using an 8-color ink jet printer (manufactured by Seiko Epson Corporation. Pigment-type dedicated inks manufactured by Seiko Epson Corporation were used as inks for ink jet printing.

Example 1

Horaopolypropylene [MFR: 10 g/10 minutes (230° C. 21.18 N), melting point: 163° C. referred to as "HOPP"

hereinafter) was used as a resin for a resin layer (A1). Also, an ethylene-methyl (meth)acrylate copolymer [density: 0.940 g/cm³, MA content: 18%, referred to as "MA1" hereinafter] was used as a resin for a resin layer (A2). The resins were supplied to an extruder (nozzle diameter 50 mm) for the resin layer (A1) and an extruder (nozzle diameter 50 mm) for the resin layer (A2), respectively, and molten at 200° C. to 250° C. The molten resins were supplied to a co-extrusion multi-layer film production apparatus (temperatures of feed block and T die: 250° C.) including a feed block according to a T-die chill-roll method, and were co-melt-extruded to produce a co-extruded multilayer film having the layer structure (A1)/(A2) including the two layers having thicknesses 96 μm and 24 μm (120 μm in total), respectively. Then, corona discharge treatment was performed on the surface of the layer (A2) of the base material so that wet tension was 40mM/m, and then the ink-receiving agent (b-1) prepared in Preparation Example 1 was applied to the surface to form an ink jet recording medium. Printing was performed on the receiving layer (B) of the resultant ink jet recording medium by using an ink jet printer, and an ester-based adhesive "LX500" manufactured by DIG Corporation was applied to the printed surface so that the thickness of the adhesive was 2 μm. Then, a stretched polyester film (PET) with a thickness of 12 μm manufactured by Toyobo Co., Ltd. was laminated, thereby producing an ink jet printed material of Example 1.

Example 2

An ink jet recording medium and a printed material thereof were produced by the same method as in Example I except that the ink receiving agent (b-1) used in Example 1 was replaced by the ink receiving agent (b-2) prepared in Preparation Example 2.

Example 3

An ink jet recording medium and a printed material thereof were produced by the same method as in Example 1 except that the acid-modified olefin resin of the resin layer (A2) in Example 1 was replaced by an ethylene-methyl acrylate copolymer [MA content: 12%, density: 0.933 g/cm³, referred to as "MA2" hereinafter].

Example 4

An ink jet recording medium and a printed material thereof were produced by the same method as in Example 1 except that the acid-modified olefin resin of the resin layer (A2) in Example 1 was replaced by an ethylene-methyl acrylate-maleic anhydride copolymer [density: 1.00 g/cm³, copolymer content: 15%, referred to as "MA3" hereinafter].

Example 5

An ink jet recording medium and a printed material thereof were produced by the same method as in Example 1 except that the resin MA1 for the resin layer (A2) in Example 1 was replaced by a mixture of 50% of the resin MA1 and 50% of a propylene-ethylene copolymer [density: 0.900 g/cm³, MFR: 7 to 9 g/10 min (230° C. 21.18 H), melting point: 150° C. referred to as "COPP1" hereinafter].

Example 6

An ink jet recording medium and a printed material thereof were produced by the same method as in Example 1 except that the resin MA1 for the resin layer (A2) in Example 1 was replaced by a mixture of 20%. of the resin MA1 and 80% of COPP1.

Example 7

An ink jet recording medium and a printed material thereof were produced by the same method as in Example 5except that HOPP of the resin layer (A1) in Example 5 was replaced by high-density polyethylene [density 0.963 g/cm³, MFR: 7 g/10 min (190° C., 21.18 N), melting point: 130° C. referred to as "HDPE" hereinafter].

Example 8

An ink jet recording medium and a printed material thereof were produced by the same method as in Example 5 except that HOPP of the resin layer (A1) in Example 5 was replaced by medium-density polyethylene [density 0.934 g/cm³, MFR: 5.3 g/10 min (190° C., 21.18 N), melting point: 119° C., referred to as "MDPE" hereinafter].

Example 9

An ink jet recording medium and a printed material thereof were produced by the same method as in Example 1 except that the acrylic acid-modified resin in Example 1 was replaced by an ethylene-(meth)acrylic acid copolymer [density 0.940 g/cm³, acid modification rate: 12%, referred to as "MA4" hereinafter].

Example 10

An ink jet recording medium and a printed material thereof were produced by the same method as in Example 1 except that the layers in the film layer structure (A1)/(A2) in Example 1 had thicknesses of 114 μm and 6 μm (120 μm in total).

Example 11

An ink jet recording medium and a printed material thereof were produced by the same method as in Example 1 except that the layers in the film layer structure (A1)/(A2) in Example 1 had thicknesses of 90 μm and 30 μm (120 μm in total).

Example 12

An ink jet recording medium and a printed material thereof were produced by the same method as in Example 1except that the layers in the film layer structure (A1)/(A2) in Example 1 had thicknesses of 56 μm and 14 μm (70 μm in total).

Example 13

An ink jet recording medium and a printed material thereof were produced by the same method as in Example 1 except that the layers in the film layer structure (A1)/(A2) in Example 1 had thicknesses of 24 μm and 6 μm (30 μm in total).

Example 14

An ink jet recording medium and a printed material thereof were produced by the same method as in Example 1except that a propylene-ethylene copolymer [MFR: 8 g/10 min (230° C. 21.18 N), melting point: 138° C. referred to as "COPP2" hereinafter] was used as a resin for the resin layer (A1).

Example 15

An ink jet recording medium and a printed material thereof were produced by the same method as in Example 14 except that the layers in the film layer structure (A1)/(A2) in Example 14 had thicknesses of 56 μm and 14 μm (70 μm in total).

Example 16

An ink jet recording medium and a printed material thereof were produced by the same method as in Example 14 except that the layers in the film layer structure (A1)/(A2) in Example 14 had thicknesses of 24 μm and 6 μm (30 μm in total).

Example 17

An ink jet recording medium and a printed material thereof were produced by the same method as in Example 14 except that the ink receiving agent (b-1) used in Example 14 was replaced by the ink receiving agent (b-2) prepared in Preparation Example 2.

Example 18

An ink jet recording medium and a printed material thereof were produced by the same method as in Example 14 except that the acid-modified olefin resin of the resin layer (A2) in Example 14 was replaced, by MA2.

Example 19

An ink jet recording medium and a printed material thereof were produced by the same method as in Example 14 except that the acid-modified olefin resin of the resin layer (A2) in Example 14 was replaced by MA3.

Example 20

An ink jet recording medium and a printed material thereof were produced by the same method as in Example 14 except that the resin MA1 for the resin layer (A2) in Example 14 was replaced by a mixture of 50% of the resin MAI and 50% of COPP1.

Example 21

An ink jet recording medium and a printed material thereof were produced by the same method as in Example 14 except that the resin MA1 for the resin layer (A2) in Example 14 was replaced by a mixture of 20%. of the resin MA1 and 80% of COPP1.

Example 22

An ink jet recording medium and a printed material thereof were produced by the same method as in Example 20 except that COPP2 of the resin layer (A1) in Example 20 was replaced by HDPE.

Example 23

An ink jet recording medium and a printed material thereof were produced by the same method as in Example 20 except that COPP2 of the resin layer (A1) in Example 20 was replaced by MDPE.

Example 24

An ink jet recording medium and a printed material thereof were produced by the same method as in Example 14 except that the acrylic acid-modified resin in Example 14 was replaced by MA4.

Example 25

An ink jet recording medium and a printed material thereof were produced by the same method as in Example 14 except that the layers in the film layer structure (A1)/(A2) in Example 14 had thicknesses of 114 μm and 6 μm (120 μm in total).

Example 26

An ink jet recording medium and a printed material thereof were produced by the same method as in Example 14 except that the layers in the film layer structure (A1)/(A2) in Example 14 had thicknesses of 90 μm and 30 μm (120 μm in total).

Example 27

An ink jet recording medium and a printed material thereof were produced by the same method as in Example 14 except that the stretched polyester film for overcoating used in Example 14 was replaced by a stretched nylon film (Ny) manufactured by Toyobo Co., Ltd. and having a thickness of 15 μm.

Example 28

An ink jet recording medium and a printed material thereof were produced by the same method as in Example 14 except that the stretched polyester films for overcoating used in Example 1 was replaced by a stretched polypropylene film (PP) manufactured by Toyobo Co., Ltd. and having a thickness of 25 μm.

Comparative Example 1

An ink jet recording medium and a printed material thereof were produced by the same method as in Example 1 except that the acid-modified olefin resin of the resin layer (A2) in Example 1 was replaced by COPP1.

Comparative Example 2

An ink jet recording medium and a printed material thereof were produced by the same method as in Comparative Example 1 except that, the ink-receiving agent (b-1) in Comparative Example 1 was replaced by the ink-receiving agent (b-2).

Comparative Example 3

An ink jet recording medium and a printed material thereof were produced by the same method as in Example 1 except that the acid-modified olefin resin of the resin layer (A2) in Example 1 was replaced by HDPE.

Comparative Example 4

An ink jet recording medium and a printed material thereof were produced by the same method as in Example 28 except that the acid-modified olefin resin of the resin layer (A2) in Example 28 was replaced by COPP1.

Comparative Example 5

An ink jet recording medium and a printed material thereof were produced by the same method as in Comparative Example 2 except that HOPP of the resin layer (A1) in Comparative Example 2 was replaced by linear low-density polyethylene [MFR: 4.0 g/10 min (190° C. 21.18 N), melting point: 105° C. referred to as "LLDPE" hereinafter].

Comparative Example 6

An ink jet recording medium and a printed material thereof were produced by the same method as in Comparative Example 3 except that HOPP of the resin layer (A1) in Comparative Example 3 was replaced by COPP2.

TABLE 1

| | | Example | | | | | | | |
|---|---|---|---|---|---|---|---|---|---|
| | | 1 | 2 | 3 | 4 | 5 | 6 | 7 | 8 |
| Layer (A1) resin composition | HOPP | 100 | 100 | 100 | 100 | 100 | 100 | | |
| | HDPE | | | | | | | 100 | |
| | MDPE | | | | | | | | 100 |
| Thickness of layer (A1) (μm) | | 96 | 96 | 96 | 96 | 96 | 96 | 96 | 96 |
| Layer (A2) resin composition | MA1 | 100 | 100 | | | 50 | 20 | 50 | 50 |
| | MA2 | | | 100 | | | | | |
| | MA3 | | | | 100 | | | | |
| | COPP1 | | | | | 50 | 80 | 50 | 50 |
| Thickness of layer (A2) (μm) | | 24 | 24 | 24 | 24 | 24 | 24 | 24 | 24 |
| Receiving agent | b-1 | 100 | | 100 | 100 | 100 | 100 | 100 | 100 |
| | b-2 | | 100 | | | | | | |
| Thickness of layer (B) (μm) | | 10 | 10 | 10 | 10 | 10 | 10 | 10 | 10 |
| Thickness of adhesive layer (μm) | | 2 | 2 | 2 | 2 | 2 | 2 | 2 | 2 |
| Type of film for overcoating | | PET | PET | PET | PET | PET | PET | PET | PET |
| Thickness of film for overcoating (μm) | | 12 | 12 | 12 | 12 | 12 | 12 | 12 | 12 |
| Total film thickness (μm) | | 144 | 144 | 144 | 144 | 144 | 144 | 144 | 144 |
| Coatability of receiving layer | | Good | Good | Good | Good | Good | Good | Good | Good |
| Heat resistance of film | | Good | Good | Good | Good | Good | Good | Good | Good |
| Adhesion of ink-receiving layer | | Good | Good | Good | Good | Good | Good | Good | Good |
| Printability | | Good | Good | Good | Good | Good | Good | Good | Good |
| Adhesion of printed surface after printing | | Good | Good | Good | Good | Good | Good | Good | Good |
| Durability of printed material | | Good | Good | Good | Good | Good | Good | Good | Good |
| Adhesion after overcoating | | Good | Good | Good | Good | Good | Good | Good | Good |

TABLE 2

| | | Example | | | | |
|---|---|---|---|---|---|---|
| | | 9 | 10 | 11 | 12 | 13 |
| Layer (A1) resin composition | HOPP | 100 | 100 | 100 | 100 | 100 |
| Thickness of layer (A1) (μm) | | 96 | 114 | 90 | 56 | 24 |
| Layer (A2) resin composition | MA1 | | 100 | 100 | 100 | 100 |
| | MA4 | 100 | | | | |
| Thickness of layer (A2) (μm) | | 24 | 6 | 30 | 14 | 6 |
| Receiving agent | b-1 | 100 | | 100 | 100 | 100 |
| Thickness of layer (B) (μm) | | 10 | 10 | 10 | 10 | 10 |
| Thickness of adhesive layer (μm) | | 2 | 2 | 2 | 2 | 2 |
| Type of film for overcoating | | PET | PET | PET | PET | PET |
| Thickness of flim for overcoating (μm) | | 12 | 12 | 12 | 12 | 12 |
| Total film thickness (μm) | | 144 | 144 | 144 | 94 | 54 |
| Coatability of receiving layer | | Good | Good | Good | Good | Good |
| Heat resistance of film | | Good | Good | Good | Good | Good |
| Adhesion of ink-receiving layer | | Good | Good | Good | Good | Good |
| Printability | | Good | Good | Good | Good | Good |
| Adhesion of printed surface after printing | | Good | Good | Good | Good | Good |

TABLE 2-continued

| | | 14 | 15 | 16 | 17 | 18 | 19 | 20 | 21 | 22 | 23 |
|---|---|---|---|---|---|---|---|---|---|---|---|
| Durability of printed material | | Good | Good | Good | Good | Good | | | | | |
| Adhesion after overcoating | | Good | Good | Good | Good | Good | | | | | |

Example

| | | 14 | 15 | 16 | 17 | 18 | 19 | 20 | 21 | 22 | 23 |
|---|---|---|---|---|---|---|---|---|---|---|---|
| Layer (A1) resin composition | COPP2 | 100 | 100 | 100 | 100 | 100 | 100 | 100 | 100 | | |
| | HDPE | | | | | | | | | 100 | |
| | MDPE | | | | | | | | | | 100 |
| Thickness of layer (A1) (μm) | | 96 | 56 | 24 | 96 | 96 | 96 | 96 | 96 | 96 | 96 |
| Layer (A2) resin composition | MA1 | 100 | 100 | 100 | 1000 | | | 50 | 20 | 50 | 50 |
| | MA2 | | | | | 100 | | | | | |
| | MA3 | | | | | | 100 | | | | |
| | COPP1 | | | | | | | 50 | 80 | 50 | 50 |
| Thickness of layer (A2) (μm) | | 24 | 14 | 6 | 24 | 24 | 24 | 24 | 24 | 24 | 24 |
| Receiving agent | b-1 | 100 | 100 | 100 | | 100 | 100 | 100 | 100 | 100 | 100 |
| | b-2 | | | | 100 | | | | | | |
| Thickness of layer (B) (μm) | | 10 | 10 | 10 | 10 | 10 | 10 | 10 | 10 | 10 | 10 |
| Thickness of adhesive layer (μm) | | 2 | 2 | 2 | 2 | 2 | 2 | 2 | 2 | 2 | 2 |
| Type of film for overcoating | | PET | PET | PET | PET | PET | PET | PET | PET | PET | PET |
| Thickness of film for overcoating (μm) | | 12 | 12 | 12 | 12 | 12 | 12 | 12 | 12 | 12 | 12 |
| Total film thickness (μm) | | 144 | 94 | 54 | 144 | 144 | 144 | 144 | 144 | 144 | 144 |
| Heat resistance of film | | Good | Good | Good | Good | Good | Good | Good | Good | Good | Fair |
| Adhesion of ink-receiving layer | | Good | Good | Good | Good | Good | Good | Good | Good | Good | Good |
| Printability | | Good | Good | Good | Good | Good | Good | Good | Good | Good | Good |
| Adhesion of printed surface after printing | | Good | Good | Good | Good | Good | Good | Good | Good | Good | Good |
| Durability of printed material | | Good | Good | Good | Good | Good | Good | Good | Good | Good | Good |
| Adhesion after overcoating | | Good | Good | Good | Good | Good | Good | Good | Good | Good | Good |
| Packaging machinability | Shrinkage 140 | Good | Good | Good | Good | Good | Good | Good | Good | Good | Good |
| | Wrinkling 150 | Good | Good | Good | Good | Good | Good | Good | Good | Good | Good |
| | Peeling 160 | Good | Good | Good | Good | Good | Good | Good | Good | Good | Good |
| | 170 | Good | Good | Good | Good | Good | Good | Good | Good | Good | Good |
| | 180 | Good | Good | Good | Good | Good | Good | Good | Good | Good | Good |
| | 190 | Good | Good | Good | Good | Good | Good | Good | Good | Good | Good |
| | Transverse sealability 140 | Good | Good | Good | Good | Good | Good | Good | Good | Good | Good |
| | 150 | Good | Good | Good | Good | Good | Good | Good | Good | Good | Good |
| | 160 | Good | Good | Good | Good | Good | Good | Good | Good | Good | Good |
| | 170 | Good | Good | Good | Good | Good | Good | Good | Good | Good | Good |
| | 180 | Good | Good | Good | Good | Good | Good | Good | Good | Good | Good |
| | 190 | Good | Good | Good | Good | Good | Good | Good | Good | Good | Good |

TABLE 3

Example

| | | 24 | 25 | 26 | 27 | 28 |
|---|---|---|---|---|---|---|
| Layer (A1) resin composition | COPP2 | 100 | 100 | 100 | 100 | 100 |
| | LLDPE | | | | | |
| Thickness of layer (A1) (μm) | | 96 | 114 | 90 | 96 | 96 |
| Layer (A2) resin composition | MA1 | | 100 | 100 | 1000 | 100 |
| | MA4 | 100 | | | | |
| Thickness of layer (A2) (μm) | | 24 | 6 | 30 | 24 | 24 |
| Receiving agent | b-1 | 100 | 100 | 100 | 100 | 100 |
| Thickness of layer (B) (μm) | | 10 | 10 | 10 | 10 | 10 |
| Thickness of adhesive layer (μm) | | 2 | 2 | 2 | 2 | 2 |
| Type of film for overcoating | | PET | PET | PET | Ny | PP |
| Thickness of film for overcoating (μm) | | 12 | 12 | 12 | 15 | 25 |
| Total film thickness (μm) | | 144 | 144 | 144 | 147 | 157 |
| Coatability of receiving layer | | Good | Good | Good | Good | Good |
| Heat resistance of film | | Good | Good | Good | Good | Good |
| Adhesion of ink-receiving layer | | Good | Good | Good | Good | Good |
| Printability | | Good | Good | Good | Good | Good |
| Adhesion of printed surface after printing | | Good | Good | Good | Good | Good |
| Durability of printed material | | Good | Good | Good | Good | Good |
| Adhesion after overcoating | | Good | Good | Good | Good | Good |
| Packaging machinability | Shrinkage 140 | Good | Good | Good | Good | Good |
| | Wrinkling 150 | Good | Good | Good | Good | Good |
| | Peeling 160 | Good | Good | Good | Good | Good |
| | 170 | Good | Good | Good | Good | Good |
| | 180 | Good | Good | Good | Good | Good |
| | 190 | Good | Good | Good | Good | Good |
| | Transverse sealabilliy 140 | Good | Good | Good | Good | Good |
| | 150 | Good | Good | Good | Good | Good |
| | 160 | Good | Good | Good | Good | Good |
| | 170 | Good | Good | Good | Good | Good |
| | 180 | Good | Good | Good | Good | Good |
| | 190 | Good | Good | Good | Good | Good |

TABLE 4

Comparative Example

| | | 1 | 2 | 3 | 4 | 5 | 6 |
|---|---|---|---|---|---|---|---|
| Layer (A1) resin composition | HOPP | 100 | 100 | 100 | | | |
| | COPP2 | | | | 100 | | 100 |
| | LLDPE | | | | | 100 | |

TABLE 4-continued

|  |  | Comparative Example | | | | | |
|---|---|---|---|---|---|---|---|
|  |  | 1 | 2 | 3 | 4 | 5 | 6 |
| Thickness of layer (A1) (μm) | | 96 | 96 | 90 | 96 | 96 | 96 |
| Layer (A2) resin composition | COPP1 | 100 | 100 | | 100 | 100 | |
| | HDPE | | | 100 | | | 100 |
| Thickness of layer (A2) (μm) | | 24 | 24 | 24 | 24 | 24 | 24 |
| Receiving agent | b-1 | 100 | | 100 | 100 | | 100 |
| | b-2 | | 100 | | | 100 | |
| Thickness of layer (B) (μm) | | 10 | 10 | 10 | 10 | | |
| Thickness of adhesive layer (μm) | | 2 | 2 | 2 | 2 | 2 | 2 |
| Thickness of film for overcoating overcoating (μm) | | 12 | 12 | 12 | 25 | 12 | 12 |
| Total film thickness (μm) | | 144 | 144 | 144 | 157 | 144 | 144 |
| Coatability of receiving layer | | Good | Good | Poor | Good | Good | Poor |
| Heat resistance of film | | Good | Good | Good | Good | Poor | Good |
| Adhesion of ink-receiving layer | | Poor | Poor | Poor | Poor | Poor | Poor |
| Printability | | Good | Good | Good | Good | Good | Good |
| Adhesion of printed surface after printing | | Poor | Poor | Poor | Poor | Poor | Poor |
| Durability of printed material | | Poor | Poor | Poor | Poor | Poor | Poor |
| Adhesion after overcoating | | Poor | Poor | Poor | Poor | Poor | Poor |
| Packaging machinability | Shrinkage 140 | Good | Good | Good | Good | Good | Good |
| | Wrinkling 150 | Good | Good | Good | Good | Good | Good |
| | Peeling 160 | Good | Good | Good | Good | Good | Good |
| | 170 | Good | Good | Good | Good | Good | Good |
| | 180 | Good | Good | Good | Good | Good | Good |
| | 190 | Good | Good | Good | Good | Good | Good |
| | Transverse sealability 140 | Poor | Poor | Poor | Poor | Poor | Poor |
| | 150 | Poor | Poor | Poor | Poor | Poor | Poor |
| | 160 | Poor | Poor | Poor | Poor | Poor | Poor |
| | 170 | Poor | Poor | Poor | Poor | Poor | Poor |
| | 180 | Poor | Poor | Poor | Poor | Poor | Poor |
| | 190 | Poor | Poor | Poor | Poor | Poor | Poor |

The invention claimed is:

1. An ink jet printed material, comprising:
a layer (A1) containing a polyolefin resin (a1) as a main component;
a layer (A2) containing an acid-modified olefin resin (a2), the layer (A1) and the layer (A2) being coextrusion-laminated together; and
an ink-receiving layer (B) formed on the layer (A2) by applying an ink-receiving agent (b) on the layer (A2), the ink-receiving layer having a printed surface on which ink jet printing is performed,
wherein the polyolefin resin (a1) has a melting point of 110° C. or more.

2. An ink jet printed material, comprising:
a layer (A1) containing a polyolefin resin (a1) as a main component;
a layer (A2) containing an acid-modified olefin resin (a2), the layer (A1) and the layer (A2) being coextrusion-laminated together; and
an ink-receiving layer (B) formed on the layer (A2) by applying an ink-receiving agent (b) on the layer (A2), the ink-receiving layer having a printed surface on which ink jet printing is performed,
wherein the acid-modified olefin resin (a2) has a modification rate within a range of 3 to 40%.

3. The ink jet printed material according to claim 1, wherein the layer (A2) further contains a polyolefin resin.

4. The ink jet printed material according to claim 1, wherein a content of the acid-modified olefin resin (a2) is 20 parts by mass or more in 100 parts by mass of a resin component constituting the layer (A2).

5. The ink jet printed material according to claim 1, wherein a content of the acid-modified olefin resin (a2) is 50 parts by mass or more in 100 parts by mass of a resin component constituting the layer (A2).

6. The ink jet printed material according to claim 1, wherein the ink-receiving agent (b) contains a polyurethane resin (b1).

7. An ink jet printed material, comprising:
a layer (A1) containing a polyolefin resin (a1) as a main component;
a layer (A2) containing an acid-modified olefin resin (a2), the layer (A1) and the layer (A2) being coextrusion-laminated together;
an ink-receiving layer (B) formed on the layer (A2) by applying an ink-receiving agent (b) on the layer (A2), the ink-receiving layer having a printed surface on which ink jet printing is performed; and
an overcoat layer formed on the printed surface,
wherein the overcoat layer is a resin film laminated on the printed surface through an adhesive.

8. The ink jet printed material according to claim 7, wherein the resin film is a stretched polypropylene film, a stretched nylon film, or a stretched polyester film.

9. The ink jet printed material according to claim 1, wherein the polyolefin resin (a1) is selected from the group consisting of homopolypropylene, high-density polyethylene, medium-density polyethylene, and a propylene-ethylene copolymer.

10. An ink jet printed material, comprising:
a layer (A1) containing a polyolefin resin (a1) as a main component;
a layer (A2) containing an acid-modified olefin resin (a2), the layer (A1) and the layer (A2) being coextrusion-laminated together; and
an ink-receiving layer (B) formed on the layer (A2) by applying an ink-receiving agent (b) on the layer (A2), the ink-receiving layer having a printed surface on which ink jet printing is performed,
wherein the acid-modified olefin resin (a2) is selected from the group consisting of an ethylene-methyl (meth)acrylate copolymer, an ethylene-methyl acrylate copolymer, and an ethylene-methyl acrylate-maleic anhydride copolymer.

11. The ink jet printed material according to claim 1, which does not comprise an anchor layer or a primer layer.

* * * * *